United States Patent [19]

Wagner

[11] Patent Number: 4,928,553
[45] Date of Patent: May 29, 1990

[54] VARIABLE-INERTIA FLYWHEELS AND TRANSMISSION

[76] Inventor: John T. Wagner, 510 Wilde Ave., Drexel Hill, Pa. 19026

[21] Appl. No.: 857,839

[22] Filed: Apr. 30, 1986

[51] Int. Cl.⁵ .......................................... F16H 37/06
[52] U.S. Cl. ........................ 475/268; 74/718; 74/64; 74/572; 475/267; 475/296; 475/329
[58] Field of Search ................ 74/705, 687, 681, 718, 74/720, 64, 572, 573 F, 573 R; 180/165

[56] References Cited

U.S. PATENT DOCUMENTS

| | | | |
|---|---|---|---|
| 1,165,410 | 12/1915 | Hitchcock | 74/196 |
| 1,759,466 | 5/1930 | Porter | 74/64 |
| 1,831,633 | 11/1931 | Morici | 74/751 |
| 1,867,590 | 7/1932 | Porter | 74/64 |
| 1,878,727 | 9/1932 | Sturbelle | 74/64 |
| 2,196,654 | 4/1940 | Bertran | 74/194 X |
| 2,545,152 | 3/1951 | Haidegger | 74/194 X |
| 3,208,303 | 9/1965 | Durochoux | 74/572 |
| 3,334,528 | 8/1967 | Cancrinus | 74/751 |
| 3,364,794 | 1/1968 | Ishioka | 74/751 |
| 3,675,506 | 7/1972 | Leone | 74/572 |
| 3,802,295 | 4/1974 | Lemmens | 74/796 |
| 3,850,050 | 11/1974 | Lemmens | 74/689 |
| 3,851,545 | 12/1974 | Gumlich | 74/751 |
| 3,863,510 | 2/1975 | Benson | 74/64 |
| 3,875,814 | 4/1975 | Steuer | 74/194 |
| 3,955,428 | 5/1976 | Word | 74/64 |
| 4,088,041 | 5/1978 | Kraus | 74/572 |
| 4,169,391 | 10/1979 | Schonberger | 74/64 X |
| 4,386,536 | 6/1983 | Kraus | 74/196 |
| 4,473,753 | 9/1984 | Izumi et al. | 180/165 X |
| 4,474,076 | 10/1984 | Lehmann | 74/753 R |
| 4,495,451 | 1/1985 | Barnard | 180/165 |
| 4,532,769 | 8/1985 | Vestermark | 180/165 X |
| 4,597,463 | 7/1986 | Barnard | 180/165 |

OTHER PUBLICATIONS

"The CVT Gearless Transmission", by P. Weissler in *Mechanics Illustrated*, Mar. 1983, pp. 68–70, 72, 76 and 122.

*Primary Examiner*—Leslie A. Braun
*Assistant Examiner*—Christopher C. Campbell
*Attorney, Agent, or Firm*—Panitch, Schwarze, Jacobs & Nadel

[57] ABSTRACT

A flywheel energy storage system with a continuously-variable output speed employing a pair of variable inertia flywheels for energy storage and transfer and a second pair of variable inertia flywheels for control of the inertia of the first flywheels. A gear type transmission is provided for coupling each of the flywheels to an input shaft and each of the flywheels with an output shaft with multiple output shaft speed ranges. A system for automatic control of shifting is provided.

21 Claims, 6 Drawing Sheets

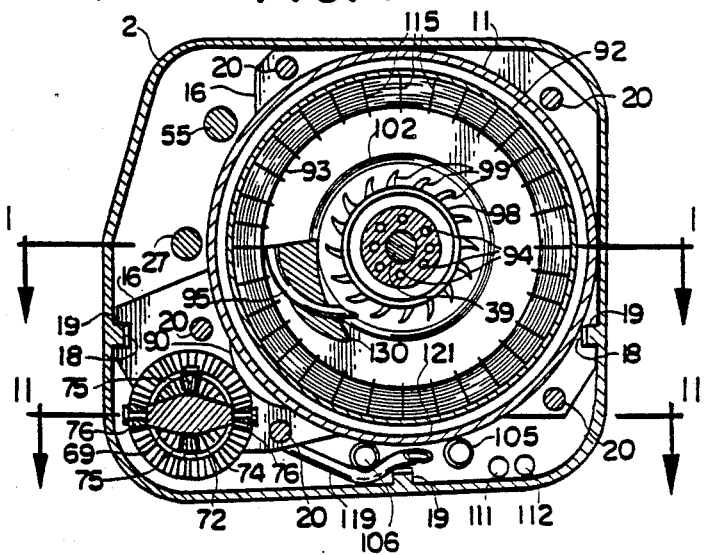
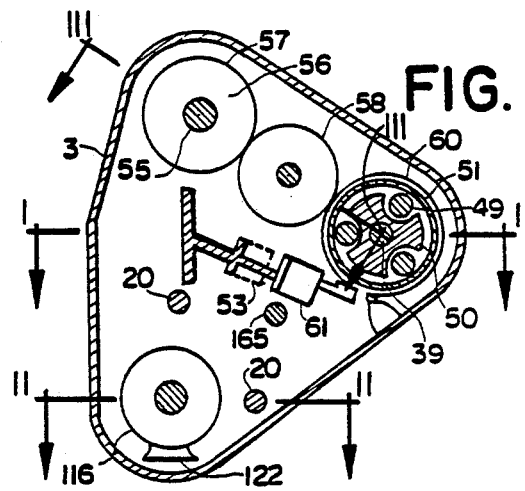
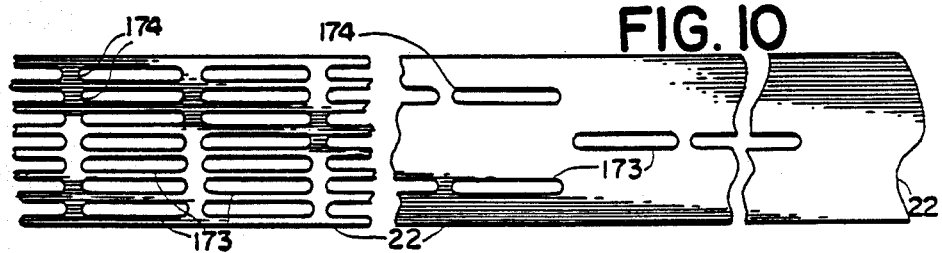

VARIABLE-INERTIA FLYWHEELS AND TRANSMISSION

BACKGROUND OF THE INVENTION

Continuously-variable transmissions are useful for reducing the energy consumption and/or simplifying the control of land vehicles and some machinery. However, mechanical transmissions of this type generally require friction wheels, chains, or belts which are less efficient, durable, and compact than conventional geared transmissions. These include, for example, U.S. Pat. No. 1,165,410 to Hitchcock, U.S. Pat. No. 2,545,152 to Haidegger, U.S. Pat. No. 3,802,295 and U.S. Pat. No. 3,850,050 to Lemmons, U.S. Pat. No. 4,386,536 to Kraus and the transmissions described and referred to in the article, "The CVT Gearless Transmission" by P. Weissler in *Mechanics Illustrated*, March, 1983, p.p. 68–76 and 122. Continuously-variable electrical, hydraulic, or pneumatic transmissions also encounter losses because of the conversions from mechanical to the other forms of energy and back again.

Energy consumption can be reduced by using flywheels to store and release energy. Flywheel energy storage can allow an engine to operate intermittently at favorable loads and allow recovery of energy that would otherwise be dissipated by braking. Continuously-variable transmissions have been necessary to match the speed of such flywheels with the required output speed.

Many torque transmission devices are controlled by or employ movable flyweights. These include the following U.S. Pat. Nos. 1,759,466 to Porter, 1,831,633 to Morici, 1,867,590 to Porter, 1,878,727 to Sturbelle, 2,196,654 to Betran.

The inertia generated by the flyweights is controlled strictly by the speed of a rotating shaft and is thus predetermined for any speed of the shaft. Any energy storage in the flyweights is incidental and cannot be used as a controllably variable source of rotational energy or momentum.

U.S. Pat. No. 3,851,545 to Gamlich describes a continuously variable transmission employing pairs of gyros. Power transmission is entirely through gearing. Although the gyros store considerable energy, that energy is neither obtained from the output shaft nor transmittable to the output shaft. Thus, there is no useful energy storage provided between the prime mover and the load.

SUMMARY OF THE INVENTION

One aspect of the invention is the incorporation of variable inertia flywheels into an energy storage apparatus. According to this aspect of the invention, the apparatus comprises a pair of variable inertia flywheels and an output shaft and means for coupling the output shaft with either of said variable inertia flywheels. A control means is provided for simultaneously increasing the moment of inertia of one of the variable flywheels while reducing the moment of inertia of the remaining one of the flywheels. The control mean transfers angular momentum between at least one of the flywheels and the output shaft.

One important aspect of the invention is that, the flywheels are mounted for rotation about a common axis and an axle is provided coaxial with the axis and passing through the flywheels for coupling either of the flywheels with the output shaft.

Where the drum, spool and flexible strip flywheels of the subject invention are employed, it is suggested that the strip member be wound around the spool member in a direction such that rotation of the spool member faster than the drum member causes the strip to be wound on the spool member. Means are also suggestibly provided coupling said drum members and said spool members of the pair of variable inertia flywheels together to cause the spool members to rotate at an average speed equal to the average speed of rotation of the drum members and cause relative rotation between the drum and spool members of one flywheel to be exactly the opposite of relative rotation between the drum and spool members of the remaining flywheel. Suitable means, such a gear train, is further provided between the rotor drum member and the spool member of each of the flywheels to prevent overtravel.

The invention further includes a gear and shaft transmission for coupling the pair of flywheels with the output shaft. According to this aspect of the invention, an intermediate shaft is provided passing through the spool members and drum members of the variable inertia flywheels for coaxial rotation therewith. Suitable means such as a clutch is provided for coupling either the flywheel or the intermediate shaft. Suitable means are similarly provided for coupling the intermediate shaft with the output shaft. According to the invention, a clutch is provided for coupling the intermediate shaft to the output shaft for direct drive during the highest output speeds. Also provided for lower speeds are a planetary gear system including an internal gear at the end of the intermediate shaft, a plurality of planetary gears and a planetary gear carrier coupled with the output shaft. Further provided are a sun gear supported for rotation about the intermediate shaft with respect to the planetary gear and a gear train coupleable between a remaining one of the pair of flywheels for transmitting to the sun gear rotation of that remaining flywheel in a reverse direction thereby reducing the output speed. Further, according to this aspect of the invention, a brake is provided for preventing rotation of the sun gear providing an intermediate shaft rotation speed.

Accordingly, it is an object of the invention to provide an improved flywheel energy storage system.

It is a further object of the invention to use gearing to add and remove energy from the flywheel energy storage system so as to reduce conversion losses.

It is yet another object of the invention to provide a gear type transmission for obtaining a wide range of output speeds from a flywheel energy storage system.

It is yet another object to provide a flywheel storage system with paired flywheels for load balancing.

It is yet another object of the invention to provide a pair of variable inertia flywheels for flywheel energy storage and a control system for varying the two moments of inertia of the flywheels to add and remove energy from the system.

The disclosed mechanical transmission combines flywheel energy storage with a continuously-variable output over several overlapping speed ranges. The output is infinitely-variable in the lowest speed range. Power is efficiently transmitted through conventional gears and clutches, not through special friction or gripping elements.

Many component arrangements, methods of varying and controlling flywheel inertia, and gearing the flywheels are possible with this invention. The illustrated embodiment provides a direct connection between a flywheel and output shaft in the highest speed range for minimum gearing losses, uses bevel gearing only where pitchline velocities and loads are relatively low for minimum cost, and has no bearings that are heavily loaded by flyweights. The last feature and a favorable stress distribution permits a reasonably high energy storage capacity for a given weight and volume.

The disclosed design shows two methods for varying flywheel inertia; one for the main flywheels, the other for the control system. The latter method is somewhat less efficient, but is well-suited to this application and causes only a minor energy loss.

BRIEF DESCRIPTION OF THE FIGURES

The invention is shown in the following figures in which:

FIG. 7 is a transverse cross-section in plane VII of FIGS. 1 and 2 passing through a liquid-weighted control flywheel and illustrating a special differential.

FIG. 8 is a transverse cross-section in plane VIII of FIGS. 1–3 and shows the pitch lines of gears in a train and in a planetary unit at the output end of the transmission.

FIG. 10 depicts diagrammatically a second variable inertia flywheel strip design.

FIG. 11 depicts diagrammatically a third variable inertia flywheel strip design.

DETAILED DESCRIPTION OF THE INVENTION

Figure 1:
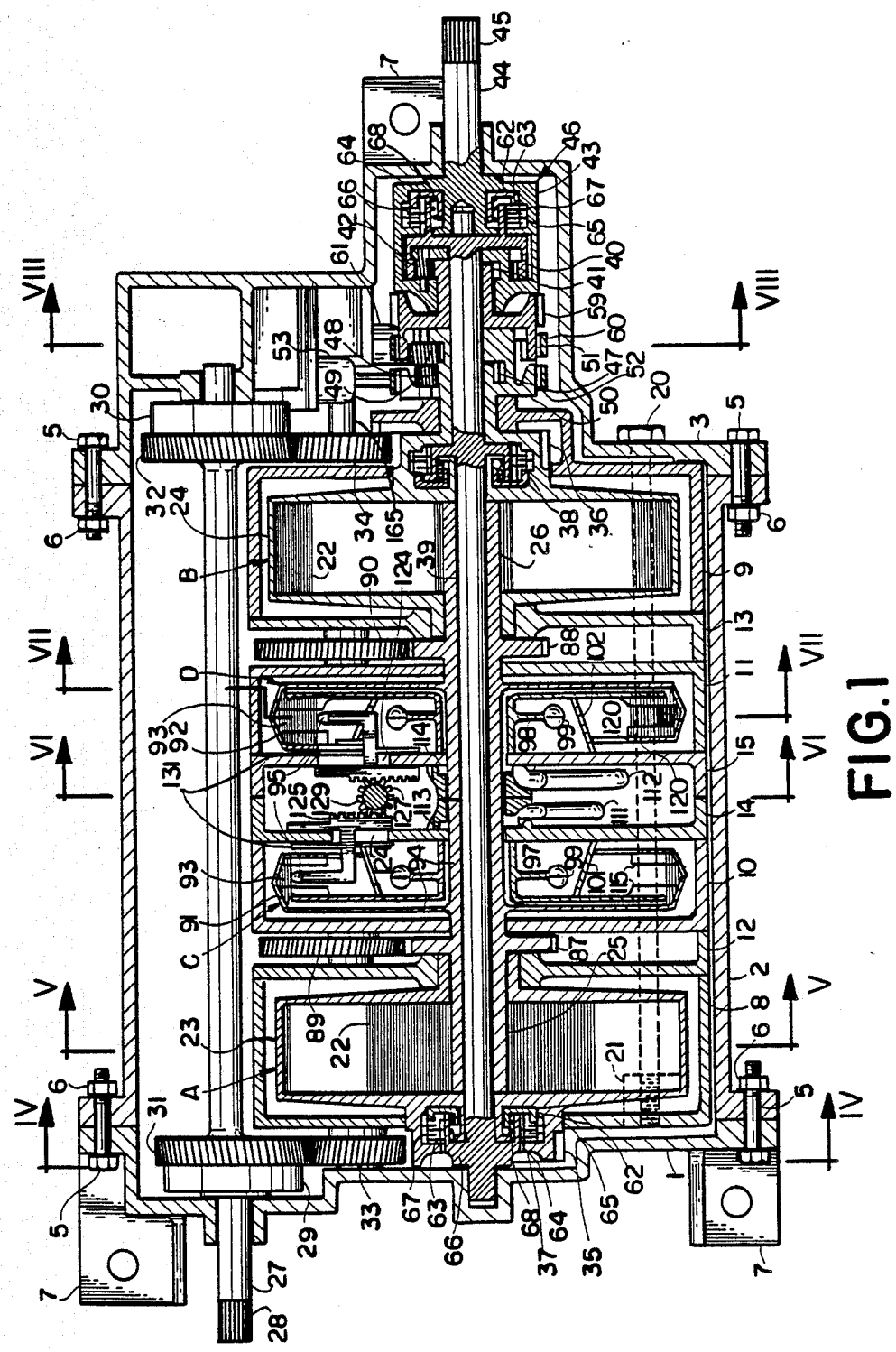
FIG. 1 is a longitudinal section of the transmission in plane I of FIGS. 4–8, passing axially through two main flywheels used for energy storage, two liquid-weighted flywheels used for control, and through shafts, clutches, and gearing for power transmission.

In the figures, joints required for assembly of the rotating parts are omitted for clarity, along with any associated keys, splines, screws, or bolts. Plain bearings are shown for the same reason. Ball or roller bearings can obviously be substituted where advantageous.

It is convenient to use two main flywheels of the same size and two control flywheels of the same size.

Parts are depicted and numbered as follows in one or more of the figures:
1 input end cap;
2 central shell;
3 output end cap;
4 bolts;
5 fitted bolts;
6 nuts;
7 mounting lugs;
8,9 main flywheel cover cups;
10,11 control flywheel cover cups;
12, 13, 14, 15 spacer cups;
16 transverse ribs;
17 lug;
18 locating notches in ribs 16 and lug 17;
19 longitudinal ribs on shell 2;
20 tie bolts;
21 lugs on cup 8 threaded for tie bolts 20;
22 flexible strip(s) flyweight, in each main variable inertia flywheel;
A, B main variable inertia flywheels;
23, 24 main flywheel rotor drums;
25, 26 main flywheel spools extending into the hollow interior of each drum 23 and 24, respectively;
27 input shaft;
28 splines for coupling engine to input shaft 27;
29, 30 clutches for connecting input shaft 27 to rotor drums 23 and 24, respectively.
31, 32 gear teeth on clutches 29 and 30, respectively;
33, 34 idler gears meshing with teeth 31 and 32, respectively;
35, 36 gear teeth on rotor drums 23 and 24, meshing with idler gears 33 and 34, respectively;
37, 38 clutches for connecting rotor drums 23 and 24, respectively, to intermediate shaft 39;
39 intermediate shaft;
40 internal gear at end of intermediate shaft 39;
41 sun gear;
42 planet gears;
43 planet carrier mounted to output shaft 44;
44 output shaft;
45 splines for coupling driven mechanism to output shaft 44;
46 clutch for connecting intermediate shaft 39 to output shaft 44;
47 sun gear on drum 24;
48, 49 planet gears meshing with sun gear 47 and internal gear 51, respectively;
50 planet carrier;
51 internal gear meshing with planet gear 49;
52 brake band for planet carrier 50;
53 actuator for applying brake band 52;
54 gear meshing with gear teeth 31;
55 reverse transmission shaft mounting gear 54;
56 clutch for connecting shaft 55 to sun gear 41;
57 gear teeth on clutch 56;
58 idler gear meshing with gear 57;
59 gear meshing with idler gear 58;
60 brake band for internal gear 51;
61 actuator for brake band 60;
62 annular piston in clutch 46;
63 friction disks of clutch 46;
64 hub of clutch 46;
65 drum of clutch 46;
66 splines extending radially out from clutch hub 64;
67 splines extending radially in from clutch drum 65;
68 clutch release spring between hub 64 and inner periphery of piston 62;

(Parts 60 to 68 are also designated on FIG. 1 for clutch 37.)
69 carrier for pinions 75 and 76;
70 gear wheel, geared to spool 26;
71, 72 bevel gears, geared through shafts 83 and 84 to rotor drums 23 and 24, respectively;
73 bevel gear, geared to spool 25;
74 bevel gear teeth on gear wheel 70;
75 pinions, meshing with bevel gears 71 and 72;
76 pinions, meshing with gear 73 and bevel teeth 74;
77 gear wheel, geared to rotor drum 23;
78 gear wheel, geared to spool 25;
79 external helical or spur teeth on gear wheel 77, meshing with idler 33;
80 gear joined with gear 72 and meshing with idler 34;
81, 82 external helical or spur teeth on gear wheels 78 and 70, respectively;
83 shaft connecting bevel gear 71 and gear wheel 77;
84 hollow shaft concentric with shaft 86 and connecting gear wheel 72 and gear 80 and driving pumps 109 and 110;
85 hollow shaft concentric with shaft 83 and connecting bevel gear 73 and gear wheel 78;
86 shaft connecting pinion carrier 69 and hydraulic pump 116;
87, 88 gears attached to spools 25 and 26, respectively;
89, 90 idler gears meshing with gear teeth 81 and 82, respectively, and with gears 87 and 88, respectively;
C, D control variable inertia flywheels attached to spools 25 and 26, respectively;
91 92 substantially toroidal liquid support housings of flywheels C and D, respectively;
93 liquid for weighting control flywheels C and D;
94 channels in control flywheel housings 91 and 92;
95 scoops for removing liquid from control flywheel housings 91 and 92;
96 support bars for scoops 95;
97, 98 hydraulic turbines in and attached to control flywheel housings 91 and 92, respectively;
99 turbine buckets;
100 port openings in cups 14 and 15;
101, 102 cones for containing discharge of turbines 97 and 98, respectively;
103, 104 turbine discharge chutes from control flywheel housings 91 and 92, respectively;
105, 106 pipes carrying liquid from chutes 103 and 104 pump inlet chambers 108 and 107, respectively;
107, 108 inlet chambers of pumps 109 and 110, respectively;
109, 110 pumps for control flywheels;
111, 112 pipes carrying liquid from pumps 109 and 110 to control flywheel inlet chambers 113 and 114, respectively;
115 paddles in control flywheel housings 91 and 92, to keep liquid 93 rotating with the flywheels;
116 main hydraulic pump;
117 rods projecting from racks 126 (only one depicted);
118 valves (only one depicted);
119 pipe connected to discharge of pump 116;
120 lips in control flywheels housings 91 and 92;
121 holes in bottom of cups 10 and 11;
122 inlet to pump 116;
123 shaft connecting pinion carrier 69 to pump 116;
124 slots in cups 14 and 15 for scoop support bars 96;
125 upper racks;
126 lower racks;
127, 128 gear teeth on shaft 129 meshing with racks 125 and 126, respectively;
129 shaft in control system;
130 streamlined fairings for scoops 95;
131 streamlined shields covering slots 124;
132 coupling between shafts 129 and 133;
133 second shaft in control system;
134 piston on shaft 133;
135 actuator cylinder;
136 toothed clutch collar on shaft 133;
137, 138, 139 bevel gears in control system;
140 speed control shaft;
141, 142 internal teeth in gear wheels 77 and 78, respectively;
143 planet gears in control system, meshing with internal teeth 141 and sun gear teeth 148;
144 carrier for planet gears 143;
145 hollow shaft attached to planet carrier 144;
146 worm teeth on shaft 145;
147 gear wheel;
148 sun gear teeth on wheel 147;
149 gear teeth on wheel 147;
150, 151 gears in control system, meshing with teeth 142 and 149, respectively.
152 shaft connecting gears 150 and 151;
153 worm wheel, meshing with teeth 146;
154 shaft attached to worm wheel 153;
155 worm teeth on shaft 154;
156 worm wheel teeth, meshing with teeth 155;
157 swiveling block with worm wheel teeth 156;
158 pin on which block 157 swivels;
159, 160 bearing plates for block 157;
161 pawls on either side of block 157;
162 pins holding pawls 161 on block 157;
163 tension spring acting on pawls 161;
164 ratchet teeth on shaft 129;
165 shaft for idler gear 34;
166 spring-loaded stem on each valve 118;
167 transmission controller;
168 engine controller;
169 throttle actuator;
170, 171, 172 servovalves;
173 second strip embodiment;
174, 175 tapering sides between ends of strip 173;
176 third strip embodiment;
177 slots in strip 176;
178 bridges between ends of slots 177.

The outer housing of the transmission is divided into an input end cap 1, a central shell 2, and an output end cap 3, held together by bolts 4. These parts are aligned by two fitted bolts 5, with nuts 6, at each end, or by dowels or keys. Mounting lugs 7 are provided for bolting to a foundation.

A series of cups, 8 to 15, with a plurality of extending transverse ribs 16 and a lug 17 comprise the major nonrotating internal parts. The cups reduce flywheel windage losses. For maximum strength, the flat ends of the cups are extended to form the ribs, but some additional ribs may be necessary. The parts are held in alignment by fitting notches 18 in ribs 16 and lug 17 on longitudinal ribs 19 on shell 2. Outlet end cap 3 and cups 8 to 15 are held together by tie bolts 20, supported by ribs 16 and threaded into lugs 21 on cup 8. With this construction, most of the internal parts and end cap 3 can be assembled on a fixture, stacking from the output end, and piping can be connected with easy accessibility.

The assembly can then slide into shell 2 and end cap 1 can be installed.

Figure 5:
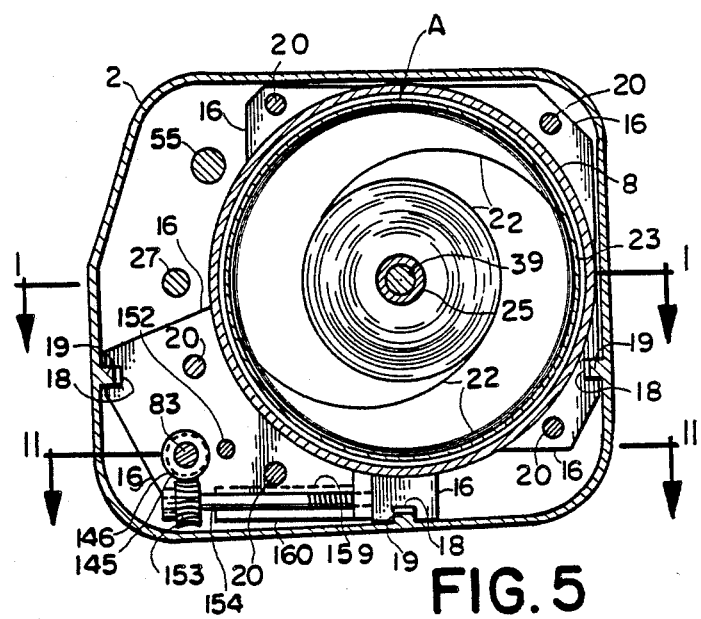
FIG. 5 is a transverse cross-section in plane V of FIGS. 1 and 2 passing through a main flywheel.

The preferred relocatable flyweights of the main flywheels A and B consist of flexible strips 22 attached at one end to the inner circumferential periphery of the main flywheel rotor drums 23 and 24 and at the other end to the outer circumferential periphery of main flywheel spools 25 and 26 respectively. Two strips 22 with ends attached 180 degrees apart along drum inner periphery and spool outer periphery are used in each flywheel A and B to balance the flywheels. The strips 22 are interleaved with one another. Centrifugal loading will force each strip 22 outward against the drum inner circumferential periphery until the portions of the strips remaining on the spools are wound tight. The strips will form skewed catenary curves between the layers on the drums and the layers on the spools, as indicated in FIG. 5. The spools are turned relative to the drums to vary the amount of strip at the different radii, thus varying the moments of inertia.

Winding more strip on a spool reduces the moment of inertia and tends to increase the rotational speed of a flywheel. If the flywheel is delivering a net output torque, its speed may not increase, but will fall more slowly than if inertia remained constant.

The spools of the two flywheels are geared in such a manner that a strip is wound on the spool of one flywheel as it is unwound from the spool of the other flywheel. This reduces the net load on the control system. The speed of one flywheel will thus tend to rise while that of the other tends to fall.

If the strips are made of a material such as flat spring steel, with a Young's modulus comparable to or higher than the drum material, the drum will not have to carry all of the centrifugal load of the strips lying against it. To move outward and burst the drum, the layers of strip must slide on each other. However the very high centrifugal loads will cause so much pressure between the layers that friction will prevent such sliding.

The only load on the control system is produced by the centrifugal load of the lengths of strip bridging the distance between the outer layer on the spool and the inner layer on the drum. If the strip is thin, this load will be a small fraction of the load that would be produced if the flyweight mass were concentrated in a few solid bodies. However, the energy required to shift the flyweight is the same because the great length of strip which must be moved offsets the reduced force.

Whenever the momentum of either flywheel becomes too low, it can be restored by an input shaft 27 with splines 28, keys, or other devices for coupling to an engine output shaft. The input shaft 27 is geared to flywheels through clutches 29 and 30, gear teeth 31 and 32 on the clutch peripheries, idler gears 33 and 34, and gear teeth 35 and 36 on the drums 23 and 24, respectively. The flywheels turn in the same direction with this gearing.

Clutches 29 and 30 would not both be engaged at the same time in normal operation and both would be disengaged to utilize the energy stored in the flywheels or to so store energy from braking.

Flywheel speed does not necessarily have to increase to absorb energy. Energy can be absorbed at a constant or a decreasing speed if the inertia of that flywheel is increasing.

Idler gears 33 and 34 could be omitted and other parts could be enlarged so that gear teeth 31 and 32 meshed directly with teeth 35 and 36, respectively. The purpose of using idlers is to avoid excessive pitchline velocities in the gearing and to reduce the overall size of the transmission.

These gear trains could readily be designed to make the flywheels turn faster or slower than the engine, if appropriate.

The rotation of flywheel drums 23 or 24 is transmitted through clutches 37 or 38 and intermediate shaft 39 to internal gear 40 in a planetary unit including sun gear 41 and planet gears 42 on a planet carrier 43. Carrier 43 is connected to the output shaft 44, which has splines 45, keys, or other devices for coupling to the driven mechanism. Clutch 46 allows the intermediate shaft 39 and the output shaft 44 to be directly connected.

The rotation of drum 24 is transmitted in a reversed direction to sun gear 41 through a planetary unit consisting of sun gear 47, planet gears 48 and 49 on planet carrier 50, and internal gear 51. The reverse rotation is transmitted when brake band 52 is applied to planet carrier 50 by actuator 53.

Figure 3:
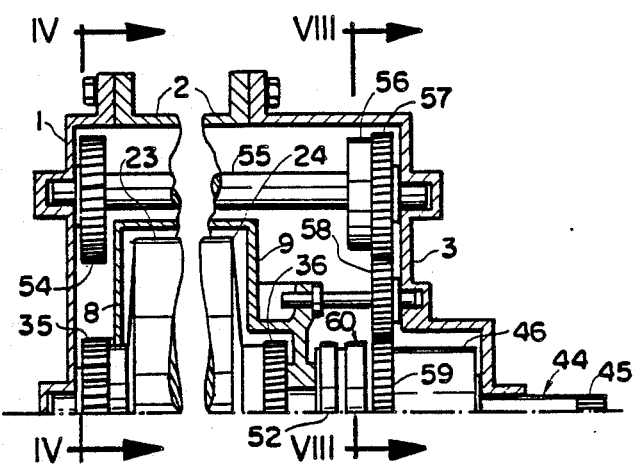
FIG. 3 is a broken longitudinal half-section in plane III of FIGS. 4 and 8, intersecting the flywheel axis that is at a different angle than FIG. 1, illustrating a shaft, clutch, and gearing for transmitting power in the lowest speed range between the main flywheel at the input end and the sun gear in a planetary gearing unit.
Figure 4:
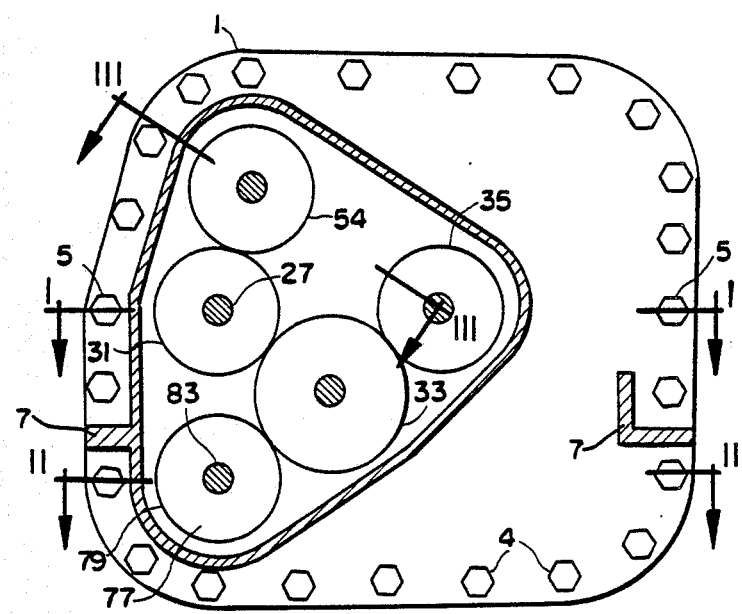
FIG. 4 is a transverse cross-section in plane IV of FIGS. 1–3 and shows the pitch lines of the gears in a train at the input end of the transmission.

The rotation of drum 23 is transmitted in a reversed direction to sun gear 41 through rotor drum gear teeth 35, idler gear 33, gear teeth 31, gear 54, reverse transmission shaft 55, clutch 56, gear teeth 57 on the periphery of clutch 56, idler gear 58, and gear 59 (FIGS. 3, 4, and 8).

An intermediate output speed range is obtained by applying brake band 60 to internal gear 51 with actuator 61 preventing the rotation of that gear (FIGS. 1 and 8).

TABLE 1

| Speed Range | Output Speed ÷ Maximum Drum Speed | Mode | Forward Driving Drum | Clutches | | | | Brake Bands | |
|---|---|---|---|---|---|---|---|---|---|
| | | | | 37 | 38 | 46 | 56 | 52 | 60 |
| 1 | −0.1 to 0.4 | 1A | 23 | E | | | | E | |
| | | 1B | 24 | | E | | E | | |
| 2 | 0.3 to 0.6 | 2A | 23 | E | | | | | E |
| | | 2B | 24 | | E | | | | E |
| 3 | 0.5 to 1.0 | 3A | 23 | E | | E | | | |
| | | 3B | 24 | | E | E | | | |

Table 1 shows which clutches and brakes are engaged (designated by "E") to obtain various ratios of output speed to the maximum speed of flywheel drums 23 or 24. Other clutches and brakes are disengaged. Numerical values of the ratios are for the case where gear proportions are such that planet carrier 43 rotates at 0.6 of the speed of internal gear 50 and 0.4 of the speed of sun gear 41, where the transmission ratio between either drum and gear 41 is −1.0, and where the speed of each flywheel can be varied between 0.5 of the maximum drum speed and the maximum.

The ratios in Table 1 are not proportional to the absolute speeds that can be obtained when using stored energy. The energies in the flywheels and the maximum speeds that are obtained from each flywheel are continually changing in this situation.

The reciprocal speed ratio in mode 1A, Table 1, is infinitely variable. The reason for adding any other modes is that only a relatively small amount of the total stored energy can be utilized in this mode. The flywheels would have to be excessively heavy if this were the only mode.

A forward output torque in mode 1A is split by planet gears 42 between drums 23 and 24. The torque on the forward driving drum 23 tends to lower its speed, but the torque on the reverse drum 24 tends to raise its speed. The result is that the control limits are reached and a forward output speed can no longer be maintained when there may still be much energy remaining in the flywheels.

The forward and reverse drums in mode 1B are interchanged from those in mode 1A. Most of the stored energy can be used by alternating between modes 1A and 1B. However, the fraction of the energy that can be used for acceleration from a stop or that can be stored when braking to a stop is not much different than in either mode alone.

The addition of speed ranges 2 and 3 and the associated modes allows most of the energy to be used for acceleration to an output speed equal to flywheel drum speed and allows storage of the energy from braking to a stop from such speeds. Thus flywheels for stop and go service can be reasonably light.

A planetary reduction gear is formed in speed range 2, when internal gear 51 and sun gear 41 are held stationary by brake band 60, the forward rotation of one of the flywheels is transmitted to internal gear 40, and the planet carrier 43 and output shaft 44 rotate at a reduced speeds. A direct drive from one of the flywheels is obtained in speed range 3 by engaging clutch 46. In both of these ranges, the unconnected flywheel idles, but it balances a major portion of the loads on the control system and transfers energy through that system.

Clutches 37, 38, and 46 are shown as hydraulically-operated multiple-disk friction clutches of conventional design, like those used in automatic automotive transmissions. The internal construction of clutches 29, 30 and 56 would be similar. Automatic shifting would generally be necessary because of the number of clutches and brakes.

There will usually be times at which the output speeds will be the same in two modes. Shifts are then possible with no slipping of clutches and brakes and should be made at these times. If necessary, flywheel speeds could be adjusted during shifts to eliminate slipping. Two shifts, using one mode in each speed range, should usually be sufficient when accelerating directly from a stop to a maximum speed or when braking to a stop from such a speed.

The hydraulic pressure on an annular piston 62 forces multiple disks 63 into frictional contact during engagement of the clutches. Splines 66 and 67 allow axial movement of the disks, but prevent rotation of disks relative to the hub 64 and the rotation of alternate disks relative to the drum 65. A clutch release spring 68 relieves contact loads when the hydraulic pressure is released for disengagement.

Positive engagement splined clutches could be used instead, reducing space requirements and frictional and windage drags, but introducing a risk of clashing during shifts. Two frictional clutches would still be desirable: one to unload the input shaft and another to unload the output shaft during shifts involving the respective shafts.

Figure 2:
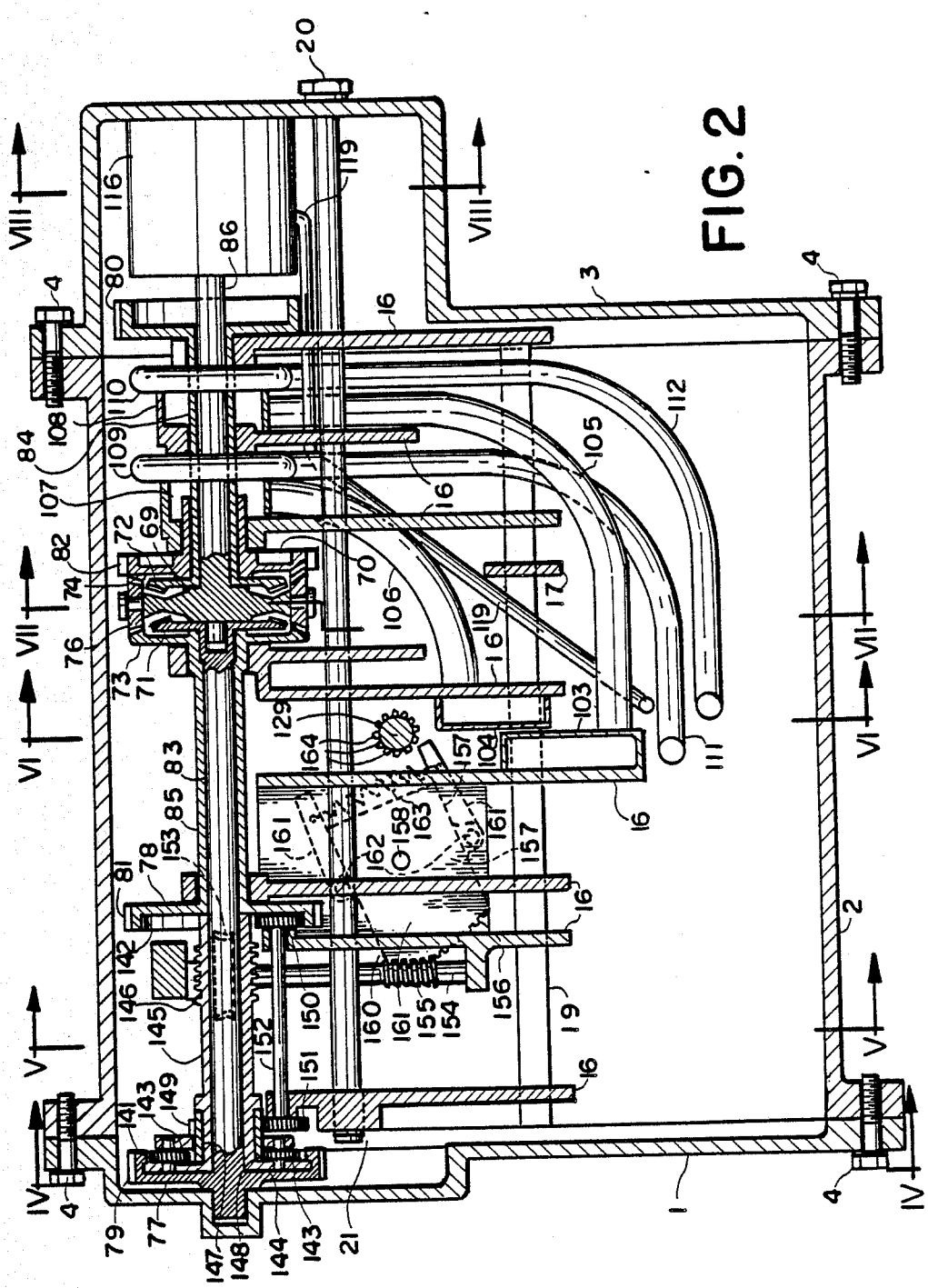
FIG. 2 is a longitudinal section in plane II of FIGS. 4–8, showing shafts and gearing for driving and controlling the main flywheels by the liquid-weighted control flywheels, low-pressure pumps and piping for the control flywheel liquid, and a higher-pressure pump for lubrication and for operating the clutches and brakes hydraulically.

A special bevel gear differential seen in FIGS. 2 and 7, consisting of bevel gears or teeth 71, 72, 73, and 74 and a carrier 69 with pinions 75 and 76 forces the spools 25 and 26 to rotate at the same average speed as the rotor drums 23 and 24. It also causes the relative rotation between drum 23 and spool 25 in the inlet end flywheel to be exactly opposite that between drum 24 and spool 26 in the output end flywheel. Pinions 75 and 76 are on the same carrier 69, but pinions 75 mesh only with bevel gears 71 and 72 and pinions 76 mesh only with bevel gear 73 and bevel teeth 74.

Rotor drum 23 is geared to bevel gear 71 through gear teeth 35, idler 33, gear teeth 79 on wheel 77, and shaft 83. Rotor drum 24 is geared to bevel gear 72 through gear teeth 36, idler 34, gear 80, and hollow shaft 84. Spool 25 is geared to bevel gear 73 through gear 87, idler gear 89, gear teeth 81 on wheel 78, and hollow shaft 85. Spool 26 is geared to bevel gear teeth 74 on wheel 70 through gear 88, idler gear 90, and teeth 82 on wheel 70. The gear ratio for each of these trains is identical.

Control variable inertia flywheels 91 and 92 are attached to spools 25 and 26, respectively (FIGS. 1 and 7). Liquid 93 is removed from a flywheel that is to be accelerated through a scoop 95 and added to the other flywheel through channels 94 to produce rotation of spools 25 and 26 relative to drums 23 and 24, respectively. Strip 22 is thus wound on one of the spools and unwound from the other.

Transmission oil, such as that used in automatic automotive transmissions, would be a suitable liquid 93 for the control flywheels, for operating clutches and actuators, and for lubrication.

A major portion of the kinetic energy in the liquid 93 entering a scoop 95 is recovered in a turbine 97 or 98 with buckets 99 before the liquid leaves the flywheel. For example, liquid is conveyed by a scoop 95 from the periphery of housing 92 into turbine 98, attached to that housing. The turbine discharge is contained by a stationary cone 102, falls through a port 100 in cup 15 into discharge chute 104, and flows through pipe 106 to the inlet chamber 107 of pump 109. The liquid is then pumped through pipe 111 into the inlet chamber 113 of the other control flywheel. It flows through channels 94 to the periphery of housing 91, slowing it. Paddles 115 keep the liquid rotating with the flywheel. Scoops 95 project through openings in cones 101 and 102 where necessary. (FIGS. 1, 2, 6, and 7).

Strip 22 is wound in such a direction that any rotation of a control flywheel that is faster than that of its main flywheel will cause strip to be wound on the spool, tending to increase the speed of the main flywheel. Thus, any friction between the rotating parts will accelerate the speed change in the main flywheel.

The energy absorbed by pumps 109 and 110 is insignificant, as only a small head is required. For convenience, these pumps are driven by shaft 84, geared to flywheel drum 24.

Figure 6:
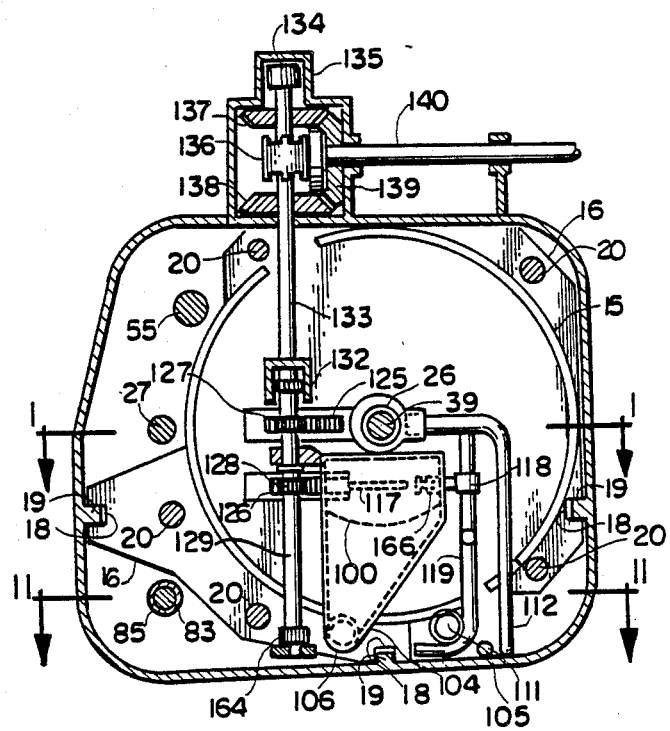
FIG. 6 is a transverse cross-section in plane VI of FIGS. 1 and 2 showing control mechanisms.

If it is ever necessary to continue main flywheel inertia adjustments after one control flywheel is filled with liquid 93, slowing of the control flywheel can be continued by adding liquid from the main hydraulic pump 116 through pipe 119 (FIGS. 2, 6, and 7) and a valve 118 (FIG. 6). When a rack 126 is in its extreme radially-inward position, a rod 117 pushes the spring-loaded stem 166 of the valve 118, opening it and admitting liquid into pipe 112 (or 111). Pipe 119 is branched to supply valves 118 for each of the pipes 111 and 112. With scoop 95 in a position radially inward from lip 120 on the control flywheel (FIG. 1), the overflow spills over the lip and drains to the bottom of shell 2 and end cap 3 through holes 121 in the bottoms of cups 10 or 11 (FIG. 7). It then returns to pump 116 through inlet 122 (FIG. 8). This procedure is inefficient because the kinetic energy in the overflow is wasted, but should be acceptable if done infrequently.

A small continuous leakage through valves 118 replenishes losses and maintains proper liquid levels in the control flywheels. The excess would normally be removed by scoops 95.

Pressure from the main hydraulic pump 116 must be high enough to operate any hydraulically-operated clutches, such as 29, 30, 37, 38, 46, or 56, and brake actuators, such as 53 and 61. The pump also maintains lubricant flow. Torque for driving this pump is divided among all flywheels through pinions 75 and 76 on carrier 69, connected to the pump by shaft 123 (FIG. 2). The pump 116 is powered by means of a shaft 86 extending from the carrier 69.

Scoops 95 are connected to racks 125 and 126 by bars 96 projecting through slots 124 in cups 14 and 15. Upper racks 125 and lower racks 126 mesh with gear teeth 127 and 128, respectively, on shaft 129 (FIGS. 1 and 6). Scoops 95 are contained in a streamlined fairing 130 (FIG. 7) and the slots are covered by streamlined shields 131 (FIG. 1) to minimize windage losses of the control flywheels. The power required to rotate shaft 129 would generally be low enough to permit manual operation.

Some mechanism is desirable to prevent speed controls from being reversed when shifts are made that interchange the forward-driving flywheels. Referring to FIG. 6, a coupling 132 transmits rotary motion of shaft 129 (see also FIG. 1) to a shaft 133 while permitting a piston 134 in a hydraulic actuator cylinder 135 to move shaft 133 along its own axis, thus engaging a double-acting toothed clutch collar 136 on shaft 133 with either of the two bevel gears 137 or 138. The speed control shaft 140 turns an attached bevel gear 139 which meshes with gear 137 and 138, turning them in opposite directions. Connecting the hydraulic system to produce the same pressure on one side of the piston 134 as in the clutch 37 and the same pressure on the other side as in clutch 38 would cause clutch 136 to engage the proper gear to turn shafts 133 and 129 in the correct direction (FIG. 6).

A mechanism to prevent overtravel in the rotations of drums 23 and 24 relative to spools 25 and 26, respectively, prevents damage to strips 22 from excessive tension (FIGS. 2 and 5). Gear wheels 77 and 81 have internal teeth 141 and 142, respectively. Teeth 141 mesh with planet gears 143 on a carrier 144 attached to a hollow shaft 145 with worm teeth 146. Planet gears 143 also mesh with sun gear teeth 148 on gear wheel 147. Teeth 142 drive wheel 147 through gears 150 and 151, attached to a shaft 152, where gear 151 meshes with teeth 149 on wheel 147. Teeth 141 have the same pitch diameter as teeth 142, planet gears 143 have the same diameter as gears 150 and 151, and teeth 148 have the same pitch diameter as teeth 149. The rotation of planet carrier 144 and shaft 145 is proportional to the difference between the rotations of gear wheels 77 and 78 and hence the difference between the rotations of drum 23 or 24 and spool 25 or 26, respectively.

The rotation of shaft 145 is reduced by worm teeth 146 meshing with a worm wheel 153 attached to shaft 154, which has worm teeth 155 meshing with teeth 156 on a block 157. Block 157 swivels on pins 158 and bears on plates 159 above and 160 below. Pawls 161 are connected to swiveling block 157 by pins 162 and are held against the block by tension spring 163.

When one of the pawls 161 engages ratchet teeth 164 on shaft 129, it prevents rotation of the shaft and motion of scoops 95 in one direction and further winding of strip 22 on one of the spools 25 or 26, but it allows scoop motion in the other direction, with consequent unwinding. To restore full speed control, it is necessary to apply engine power to one of the main flywheels through clutches 29 or 30 or to shift to a different mode. Block 157 could be connected to hydraulic valves as a component of the engine throttle control and the clutch control.

Sectors 156 and 158 slide on flat plates 162 and 163 above and below. Lugs 160 extend downward sufficiently to bear on plate 163 and the wide end of sector 158 is thick enough to bear on both plates.

Although flywheels 91 and 92 are added for speed control, the energy which they store adds to the capacity of the transmission. Their energy can reach the output both through their effects on the inertias of the main flywheels and through the gearing used to drive them.

The transmission can easily be adapted to use continuously-variable mechanical drives for control. The control device is only required to produce a variable difference in the speeds of two members, such as drum 23 and spool 25, rotating at high speed in the same direction. A 50 percent difference would be ample and could readily be obtained from continuously variable traction or belted devices. Such a device would be well-suited to the light loads and high rotational speeds required for control, but would be less suited for the higher powers and greater speed range required if used as the complete transmission.

Intermittently-operated clutches and brakes could be used for control. Efficiency losses and wear problems would probably be small because of the light loads.

Figure 9:
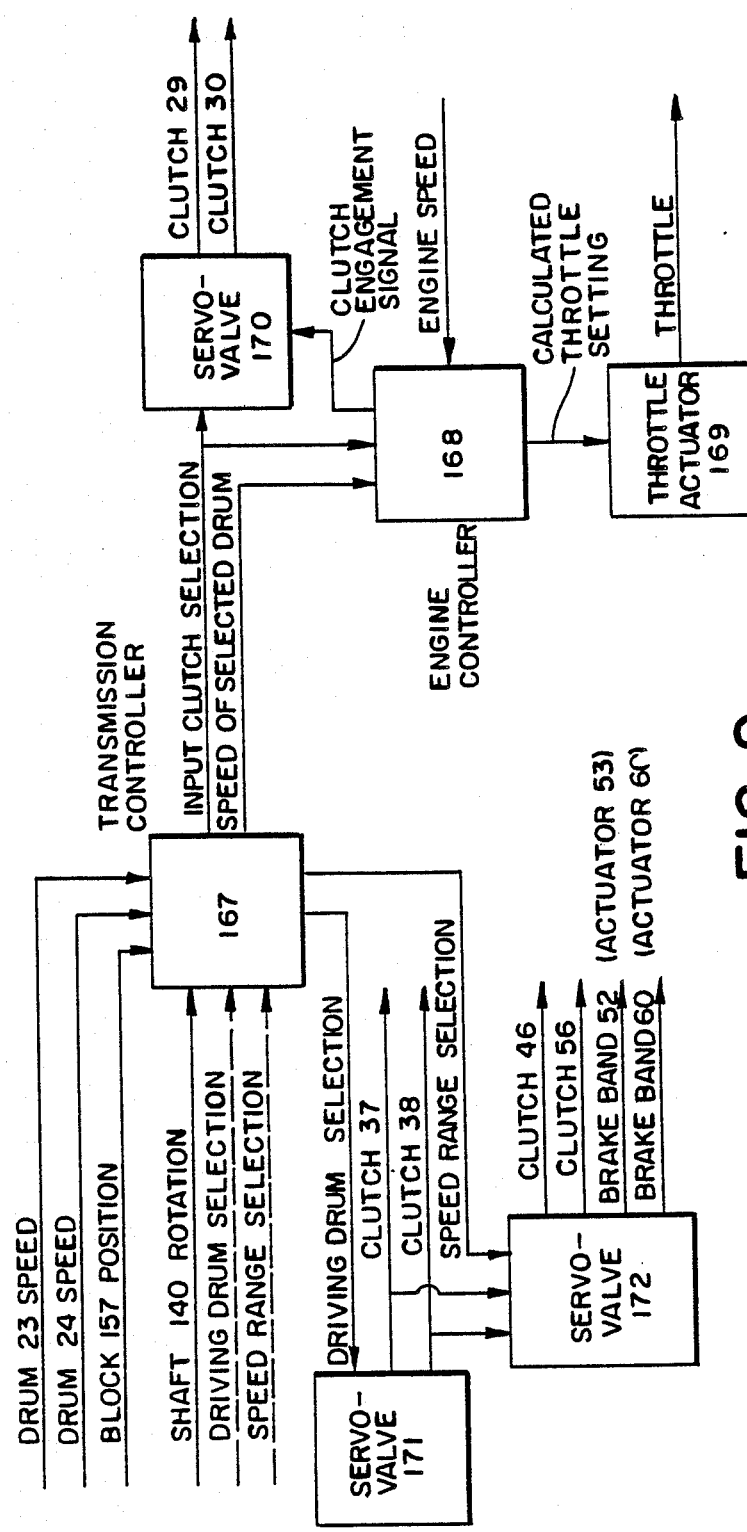
FIG. 9 depicts in block diagram form an automatic system for controlling transmission shifting and engine operation.

FIG. 9 is a diagram of a system for shifting the transmission and for operating the engine. The transmission controller 167 and the engine controller 168 could operate mechanically, hydraulically, electronically, or by a combination of methods.

The essential inputs to the transmission controller 167 are obtained from sensors indicating the speeds of drums 23 and 24, the position of flywheel control block 157, and the rotation of speed control shaft 140, which is controlled by the operator and is an indication of the desired changes in output speed. The position of block 157 is a function of the amount of strip 22 wound on spools 25 and 26 and hence the inertia associated with each of the drums 23 and 24. The angular momentum of each flywheel is computed from the product of the inertia and the drum speed. Whether either flywheel requires engine power or whether a shift is necessary to prevent over-winding of strip 22 or to control output speed is determined from the position of block 157, the momentums, the desired changes in output speed, and the current output speed. The latter is determined from the drum speeds and the current shift mode.

If engine power is required, a signal selecting the proper input clutch, 29 or 30, travels from transmission controller 167 to servovalve 170 and to engine controller 168. Controller 168 determines the throttle setting produced by throttle actuator 169. The clutch signal causes controller 168 to accelerate the engine from idle speed, until an engine speed signal into the controller matches a signal sent from controller 167 that is proportional to the speed of the selected drum. Controller 168 sends a signal to servovalve 170 and the clutch is engaged with little or no slipping. Controller 168 then adjusts the throttle for optimum fuel economy in accordance with engine speed, which is equal or proporational to drum speed when the clutch is engaged. The application of engine power continues until the termination of the clutch signal from controller 167 indicates that a limit has been reached. The clutch disengages and the engine returns to idle speed.

It would generally be economical to use a relatively small engine operating at high loads. However, the engine would have to be large enough to maintain the maximum continuous load imposed on the vehicle or machine.

Transmission controller 167 determines shift modes. There are certain ratios of drum speeds at which shifts can be made without changing drum speeds or output speeds. Shifts made at these times would cause the least slipping in clutches and brakes and the least interruption in power delivered to the output. Whether a shift should be made or suppressed when such a ratio occurs would be determined from the same information used to start and stop the application of engine power.

Although it would be simple to produce a signal to the operator when drum speeds were suitable for a shift, manual shifting would be undesirable because an operator could not react fast enough to insure a smooth shift. However, a skilled operator might improve performance by anticipating forthcoming conditions more accurately than a computing device could predict from the input information. The could select the speed range and possibly the driving flywheel in advance, as indicated by the dashed arrows into controller 167 in FIG. 9. The shift would be delayed until the ratio of drum speeds reached the proper value and would then be performed automatically.

A signal from controller 167 indicating the driving drum travels to servovalve 171, which engages the corresponding clutch 37 or 38. A signal indicating the speed range travels to servovalve 172, which operates clutches 46 and 56 and actuators 53 and 61 for brake bands 52 and 60, respectively. Hydraulic lines from servovalve 171 to clutches 37 and 38 are also connected to servovalve 172. The combination of the pressure inputs from these lines and the speed range selection produces the proper outputs from servovalve 172.

The transmission would function as an ordinary geared transmission if clutches 29 and 30 were both engaged in speed range 1, if clutch 29 were engaged in modes 2A or 3A, if clutch 30 were engaged in modes 2B and 3B, and if the flywheel inertias were held constant (Table 1). The overall transmission ratios for the gear ratios corresponding to Table 1 and to the drawings would be 0.2, 0.6, and 1.0 in speed ranges 1, 2, and 3, respectively. However, flywheel inertias would cause a very sluggish response to engine throttle changes. A faster response could be obtained in speed ranges 2 and 3 by setting the driving flywheel for minimum inertia.

A directly-geared reverse transmission ratio (−0.4) could be obtained by adding a brake on the input end of intermediate shaft 39 and engaging brake band 52 or clutch 56.

In some applications, it would be possible to carry only a small electric motor with the transmission or to carry no motor. For example, the transmission could be used instead of rechargeable batteries for energy storage and instead of an electric motor for driving some vehicles and high-powered portable tools and machinery. Advantages would be the elimination of chemical hazards and of the costs and difficulties of replacing spent or damaged batteries, rapid charging and rapid energy release without damage, ability to operate in explosive atmospheres, and a possibly higher efficiency and lighter weight.

Energy would be stored while the vehicle or machine was out of service by plugging into an electric outlet if there was a self-contained motor for accelerating the flywheels or by coupling a shaft to a stationary motor. Energy could be stored at an essentially constant motor speed by driving the output shaft of the transmission and operating its speed controls automatically. The situation would be similar to that occurring during the storage of braking energy. Input shaft 27 and clutches 29 and 30 would be unnecessary.

To store energy for long periods, it would be necessary to evacuate the air surrounding the parts rotating at high speed. A continuously-variable traction device or intermittently-operated clutches and brakes would be more suitable for speed control than liquid-weighted flywheels in this situation.

Very high strength materials would be required in the flywheels for low weight when no engine is carried.

Loads on the control system depend on the speeds and inertias of each flywheel. For a specified variation of output torque and speed, it is possible to calculate the variation in the flywheel inertias which will eliminate the load on the control system. Although the solution is different in every case, the results are similar for many cases and differ substantially from the inertia variation obtained by winding uniform strips 22 in one flywheel and unwinding at the same rate in the other flywheel. Therefore, control loads can generally be reduced by using non-uniform strips to obtain the most suitable inertia variation.

The simplest method of producing non-uniform strips is to vary the width as shown in FIG. 10. There is depicted a second strip embodiment 173 having a pair of opposing sides 174, 175 tapering between the ends of the strip 173. The appropriate inertia variation requires the narrowest portions of the strips 173 in the outer layers. Drums 23 and 24 could be designed to fit such strips. Axial displacements of strips tightly wound on spools 25 and 26 would be resisted by friction. However, there is some danger that the strips could become axially misaligned while the transmission is idle and then be damaged when put into operation.

This problem can be avoided by cutting holes in strips of uniform width. A series of aligned slots 177 would be cut as indicated in a third strip embodiment 176 depicted in FIG. 11 to leave adequate radial support for the wound layers. Both the numbers and the widths of the slots could be varied to obtain the proper inertias. Although the slots could be cut so that the remaining bridges 178 are radially aligned on the drum layers initially, the widest slots should be narrow enough to keep bending stresses in the bridges at a safe level if they do not remain aligned and are unsupported radially.

I claim:

1. An energy storage apparatus comprising:
   a pair of variable inertia flywheels;
   an output shaft;
   means for coupling the output shaft with either of said variable inertia flywheels; and
   control means for simultaneously increasing the moment of inertia of one of the pair of variable inertia flywheels while reducing the moment of inertia of the remaining one of the pair of variable inertia flywheels.

2. The apparatus of claim 1, wherein each of said variable flywheels comprises:

a drum member having a hollow interior and an inner periphery facing said axis of rotation;

a spool member positioned within said hollow interior, co-axial with said rotor drum member and rotatable with respect to said rotor drum member and having an outer periphery facing and spaced from said inner periphery of the drum member; and a flexible strip having a first end extending from a first location on said outer periphery of the spool member and an opposing and extending from a first location on said inner periphery of the drum member and wrapped a multiplicity of times around said spool member between said inner and outer peripheries.

3. The apparatus of claim 2 wherein said spool and drum members of both flywheels rotate in the same direction and said strip members are wound around said spool members in a direction such that rotation of the spool members faster than the drum members causes said strips to be wound on said spool members.

4. The apparatus of claim 3 further comprising:
means coupling said drum members and said spool members of said pair of variable inertia flywheels together for causing said spool members to rotate at an average speed equal to an average speed of rotation of said drum members and for causing relative rotation between drum and spool members of one of the flywheels to be exactly opposite a relative rotation between the drum and spool members of the remaining flywheel.

5. The apparatus of claim 2 further comprising:
means between said rotor drum member and said spool member of each of the pair of variable inertia flywheels for preventing over-travel of the drum member with respect to its spool member.

6. The apparatus of claim 1 wherein said means for coupling comprises:
an intermediate shaft passing through said pair of variable inertia flywheels for coaxial rotation therethrough; and further comprising:
means for coupling either flywheel of said pair to said intermediate shaft; and
means for coupling said intermediate and output shaft.

7. The apparatus of claim 6 wherein said means for coupling said intermediate shaft and output shafts comprises a clutch between said intermediate shaft and said output shaft.

8. The apparatus of claim 7 wherein said means for coupling said intermediate and output shafts further comprises:
an internal gear mounted on said intermediate shaft;
a plurality of planetary gears meshing with said internal gear;
a planetary gear carrier for carrying said plurality of planetary gears mounted on said output shaft.

9. The apparatus of claim 8 further comprising:
a sun gear supported for rotation about said intermediate shaft and meshing with said plurality of planetary gears; and
means controlling coupling the remaining one of said pair of flywheels with said sun gear for rotation of said sun gear reducing the output shaft rotation speed.

10. The apparatus of claim 9 further comprising:
brake means for preventing the rotation of said sun gear.

11. The apparatus of claim 6 further comprising:
controller means for automatically selecting one of said pair of variable inertia flywheels for coupling with said intermediate shaft.

12. The energy storage apparatus of claim 1 wherein said means for coupling is further adapted for selectively coupling the output shaft with both of the pair of variable inertia flywheels.

13. The apparatus of claim 1 wherein said control means further simultaneously varies the rotation speeds of the pair of flywheels from one another.

14. The apparatus of claim 1 wherein said means for coupling is further adapted for rotating either of the pair of variable inertia flywheels with the output shaft.

15. The apparatus of claim 1 further comprising:
an input shaft; and
second means for selectively coupling the input shaft with either one of the pair of variable inertia flywheels for accelerating the one flywheel.

16. The apparatus of claim 15 wherein said second coupling means is further adapted for selectively simultaneously coupling the input shaft with both of the pair of flywheel for simultaneous energy transfer to each of the pair of flywheels.

17. The apparatus of claim 1 wherein said coupling means comprises first clutch means associated with one of the pair of flywheels and second clutch means associated with the remaining one of the pair of flywheels for selectively coupling either one of the pair of variable inertia flywheels with the output shaft.

18. The apparatus of claim 17 further comprising:
an input shaft; and
second means for selectively coupling the input shaft with at least one of said pair of variable inertia flywheels for energy transfer from the input shaft to the at least one flywheel coupled with the input shaft.

19. The apparatus of claim 1 further comprising a second pair of variable inertia flywheels rotatably coupled together, each flywheel of the second pair being coupled with a separate one of the pair of flywheels.

20. An energy storing apparatus comprising:
a pair of variable inertia flywheels;
an output shaft;
means for rotationally coupling the output shaft with a selected one of the pair of variable inertia flywheels and rotating either one of the output shaft and the one selected flywheel with the remaining one of the output shaft and the one selected flywheel; and
control means for simultaneously varying the angular momentum of the pair of variable inertia flywheels from one another.

21. A transmission comprising:
a pair of variable inertia flywheels;
an output shaft;
first means for coupling the output shaft with a selected one of said variable inertia flywheels;
an input shaft;
second means for selectively coupling the input shaft with at least one of the pair of variable inertia flywheels; and
control means for simultaneously varying the angular momentum of the pair of variable inertia flywheels from one another.

* * * * *